Figure 1:
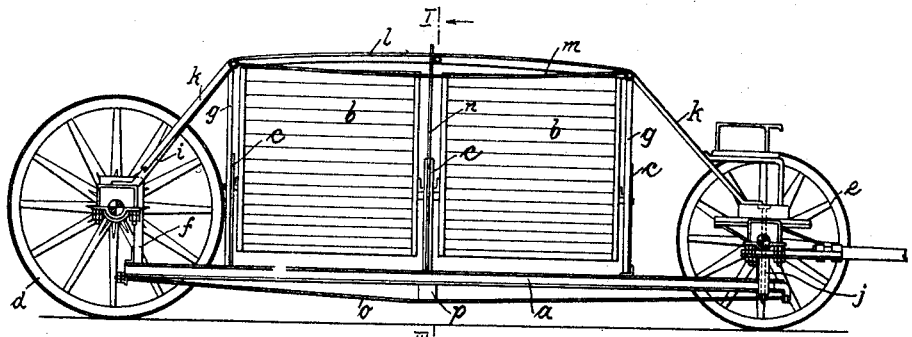

Oct. 16, 1928. 1,687,618

G. J. W. LAUENSTEIN

AGRICULTURAL CARRIAGE

Filed Aug. 8, 1927

Inventor:
G. J. W. Lauenstein.

Patented Oct. 16, 1928.

1,687,618

UNITED STATES PATENT OFFICE.

GEORG JOHANN WILHELM LAUENSTEIN, OF BARNSTEDT, NEAR LUNEBURG, GERMANY.

AGRICULTURAL CARRIAGE.

Application filed August 8, 1927, Serial No. 211,492, and in Germany May 28, 1926.

The present invention relates to improvements in carriages adapted for agricultural purposes and constructed to comply with the various requirements. The improved carriage may be used in the first place as a box-car, in the second place the possibility shall be afforded to discharge the contents of the carriage by tilting the box or body of the said carriage. Lastly the carriage shall be suitable to receive and hold high-rising loads for example such as loads of corn-stalks, hay and the like. If the improved carriage is adapted to be used in all these cases, it will meet the main agricultural requirements and make superfluous the necessity for further special vehicles.

These manifold uses involve the provision of certain special arrangements and proportions of the carriage which may be in some cases of such a nature as to defeat the practical serviceability of the carriage.

Since the carriage shall be discharged by tilting, it is indispensable to provide for two tilting receptacles, as one single tilting receptacle, of correspondingly greater dimensions would considerably increase the difficulty of tilting. Furthermore it is necessary that the hind- and fore-wheels be not situated at the side of the tilting receptacles but respectively in the rear and in front of the same, in order to preclude the tilting receptacles from being obstructed by the wheels, to give the wheels, for an easier driving, the greatest diameter possible, and yet to keep the loading-height at a favorably low level. Owing to the arrangement of two tilting-receptacles in tandem and of the fore- and hind-wheels in front and respectively in the rear of the said receptacles, the distance between the axle-trees would be so great that the longitudinal girders of the carriage-frame would receive a too great free length. Distortions and sagging of the longitudinal girders would result from such disposition, to prevent which the girders would have to be made excessively heavy. This drawback would render impossible any practical use of such carriages.

According to the present invention the performance and practical use of a carriage having two tilting receptacles and its wheels arranged in front and in the rear of these receptacles is thereby rendered possible in that the two longitudinal girders are mounted or trussed each by a truss-frame in such a manner that the tilting receptacles are not obstructed by the said truss-frames in tilting and discharging their contents. These truss-frames the upper parts of which are formed by arched beams, are fastened with respect to the longitudinal girders in such a manner that the said arched beams are a certain distance apart from each other which distance is somewhat greater than the breadth of the tilting receptacles. The said two truss-frames, that is to say the two arched beams which possess a great positive strength, are most suitable to serve for the direct reception of loads which are heaped up, such as corn- or straw-loads.

In order to still further increase the bearing-power of the arched beams or the longitudinal girders respectively the latter may be connected by suitable strut-frames.

The strengthening of the longitudinal girders by a truss-frame and a strut-frame imparts to the said girders an extraordinary strength against sagging and torsional displacement. For this reason the said longitudinal girders may consist of proportionately frail iron of commercial cross section. The carriage possesses thereby a proportionately light weight and may yet support and carry heavy loads.

In order that my invention may be more fully understood by one skilled in the art to which it appertains. I shall now proceed to describe the same in detail and for that purpose shall refer to the accompanying sheet of drawings whereon similar letters of reference indicate corresponding parts throughout the several views.

Figure 2:
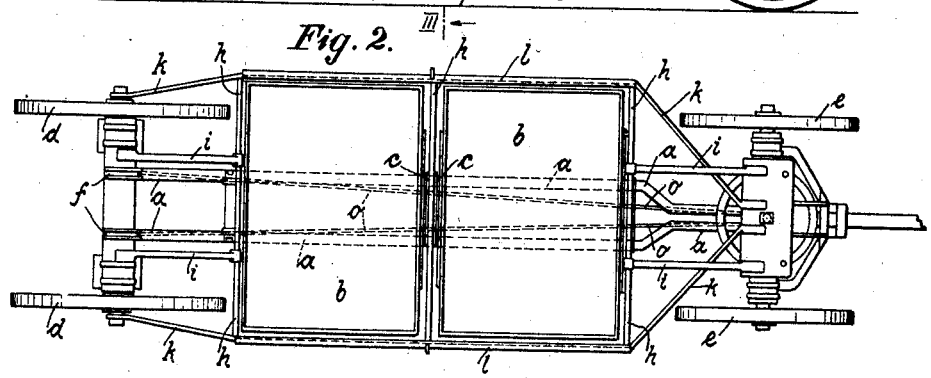
Figure 3:
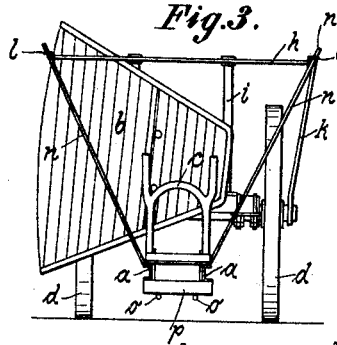
Figure 4:
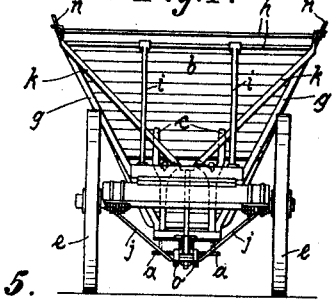
Figure 5:
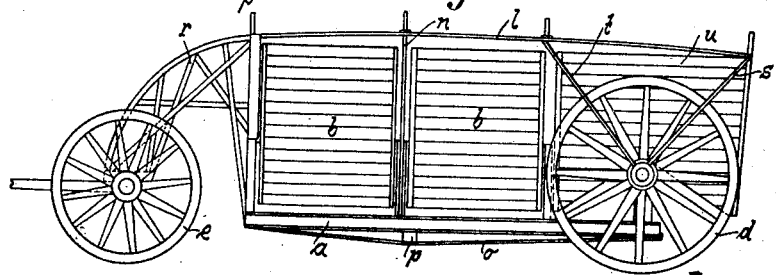

Fig. 1 is a lateral elevation of a preferred form of the improved carriage constructed in accordance with and embodying the invention; Fig. 2 is a plan and Fig. 3 a cross section of the carriage taken along the line I—III (Fig. 1); Fig. 4 is an end view of the fore-end of the carriage, Fig. 3, showing the tilting receptacle in the tilted, and Fig. 4, in the upright position; and Fig. 5 is a lateral elevation showing a modification of the carriage.

Upon the longitudinal girders $a$ are fixed for the reception of two tilting receptacles $b$ in succession suitable blocks or cradles $c$ which allow of a tilting of the receptacles $b$ towards both sides. The fore- and hind-wheels $e$ and $d$ respectively are arranged in front and in the rear of the receptacles $b$ in such a manner that they do not project into the tilting path of the said receptacles and do not obstruct the tilting motion of the latter. The longitudinal girders $a$ lie as low as possible and the hind-wheel-axle-tree, lying somewhat higher, is fastened to the back-ends of the girders $a$ by means of suspension-pieces $f$. The fore-ends of the girders $a$ are connected to the fifth wheel of the axle-tree of the fore-wheels by means of suspension-pieces $j$.

Outside in front of the end-face of the fore-receptacle $b$ and outside in the rear of the end-face of the hind-receptacle $b$ upward and outward directing supporting bars $g$ are fixed to the girders $a$. The upper free ends of the fore-bars $g$ as well as of the hind-bars $g$ are connected in transverse direction by cross bars $h$ and in longitudinal direction by longitudinal arched bars $l$ preferably of commercial cross section, and by tie rods $m$. This connection is such that the area surrounded by the said connecting bars $h, l$ is somewhat greater than the area of the top openings of the two receptacles together. The bars $h$ are connecetd to the axle-trees of the fore- and hind-wheels by suitable tie rods $i$. The upper ends of the supporting bars $g$ are likewise connected to the axle-trees of the wheels by tie-rods $k$. Owing to these rod-connections yielding of the upper ends of the bars $g$ transverse to the tilting-plane of the receptacles is entirely avoided. Furthermore a tie-rod $n$ connects at each side of the carriage the crown or ridge of the upward arched bar $l$ to the adjacent girder $a$ of the same side. The tilting receptacles may be tilted unimpeded under the bars $l$ towards both sides and may rest in the tilted position against the inner edges of the bars $l$, as is obvious from Fig. 3.

The arched bars $l$ have a great capacity of resistance against sagging. As the girders $a$ and the arched bars $l$ are connected about in the middle of their lengths by the tie-rods $n$ the girders $a$ are extraordinarily strengthened by the bars $l$.

Owing to their own great strength the arched bars $l$ by themselves may serve as a means for the reception of loads or articles, which must be highly heaped, for example corn and hay.

At the lower sides of the girders $a$ are fastened tie-rods $o$ provided with suitable tension-means. Between the girders and the tie-rods is placed, about in the middle of their lengths, a cross beam $p$ which holds the girders and tie-rods at this place a greater distance apart. When the tie-rods $o$ are sharply tensioned they act as strut-frames which further increases the strength of the girders.

The supporting frames $c$ and the tilting receptacles $b$ are removable in order to load or stow into the carriage also long objects.

In the modification shown by Fig. 5 a frame-work $r$ substantially in the form of an inverted U is rigidly attached to the fore-ends of the longitudinal girders $a$. The free leg of the frame $r$ rests upon the filter wheel of the fore-axle-tree. This arrangement is such that in turning the carriage the fore-wheels $e$ can enter into the free space of the frame $r$ whereby a so called turning on the spot, that is to say, within a circle having the smallest radius is rendered possible.

The fore-ends of the arched bars $l$ are fastened to the frame $r$, whilst the hind-ends of the same are supported by oblique or inclined supporting bars $s$ extending to the rear and fastened to the hind-axle-tree. Inclined bars $t$ extending toward the fore-end of the carriage and being likewise fixed to the hind-axle-tree serve also for supporting the arched bars $l$ at a place some distance apart from their extremities.. The tie-rods $n$ leading to the girders $a$ are arranged between the two tilting receptacles $b$ in the same manner as in the carriage above described and shown by Figs. 1 to 4. The girders $a$ of the modified carriage according to Fig. 5 may also be strengthened by strut-frames $o, p$.

The carriage according to Fig. 5 is especially adapted to support in the rear of the second tilting receptacle $b$ a third tilting receptacle $u$ which however must be tilted to the rear.

I claim:

1. A frame for dumping cars of the type having side dumping buckets arranged in tandem comprising a trust construction including lower longitudinal members, cradles mounted on said lower longitudinal members for carrying said buckets, upwardly diverging supports carried by said lower longitudinal members arranged beyond said buckets in an endwise direction at each end of said frame and extending upwardly to a horizontal plane above said buckets, and an upwardly arched longitudinal member connecting the upper ends of said supports on each side of said buckets.

2. A dumping car as claimed in claim 1 including rods connecting the central parts of said arched bars to said lower longitudinal members in substantially vertical plane passing between said buckets.

3. A dumping car as claimed in claim 1 including tie rods connecting the supports longitudinally, beneath said arched members.

In testimony whereof I have signed my name to this specification.

GEORG JOHANN WILHELM LAUENSTEIN.